United States Patent [19]

Inoue

[11] 3,729,625

[45] Apr. 24, 1973

[54] SEGMENTED STRAIGHT LINE FUNCTION GENERATOR

[75] Inventor: Masaru Inoue, Katsuta, Japan

[73] Assignee: Hitachi, Ltd., Tokyo, Japan

[22] Filed: June 2, 1971

[21] Appl. No.: 149,238

[30] Foreign Application Priority Data

June 5, 1970 Japan ................................45/47966

[52] U.S. Cl. ..............................235/197, 235/150.53

[51] Int. Cl. ................................................G06g 7/28

[58] Field of Search ...............235/197, 152, 152.1 E, 235/150.53, 150.5, 150.3

[56] References Cited

UNITED STATES PATENTS

| | | | |
|---|---|---|---|
| 3,564,222 | 2/1971 | DiPaolo | 235/197 X |
| 2,886,243 | 5/1959 | Sprague et al. | 235/150.53 |
| 3,345,505 | 10/1967 | Schmid | 235/197 |
| 3,459,926 | 8/1969 | Heilweil et al. | 235/152 |
| 3,513,301 | 5/1970 | Howe | 235/197 X |
| 3,557,347 | 1/1971 | Robertson | 235/197 X |

*Primary Examiner*—Joseph F. Ruggiero
*Attorney*—Craig, Antonelli & Hill

[57] ABSTRACT

A function generator for approximating a function of $x$, $y = f(x)$, by a segmented straight line in which $x$ coordinate values are given in the form of input pulses $\Delta x$, comprising means for preliminarily setting displacements $\Delta y$ with respect to an input pulse $\Delta x$ in accordance with the slope of said segmented straight line, in which a displacement $\Delta y$ is arranged to be applied for each input pulse $\Delta x$ to means for storing the function value corresponding to the integrated input pulses $\Delta x$.

12 Claims, 11 Drawing Figures

INVENTOR

MASARU INOUE

BY Craig, Antonelli & Hill,
ATTORNEYS

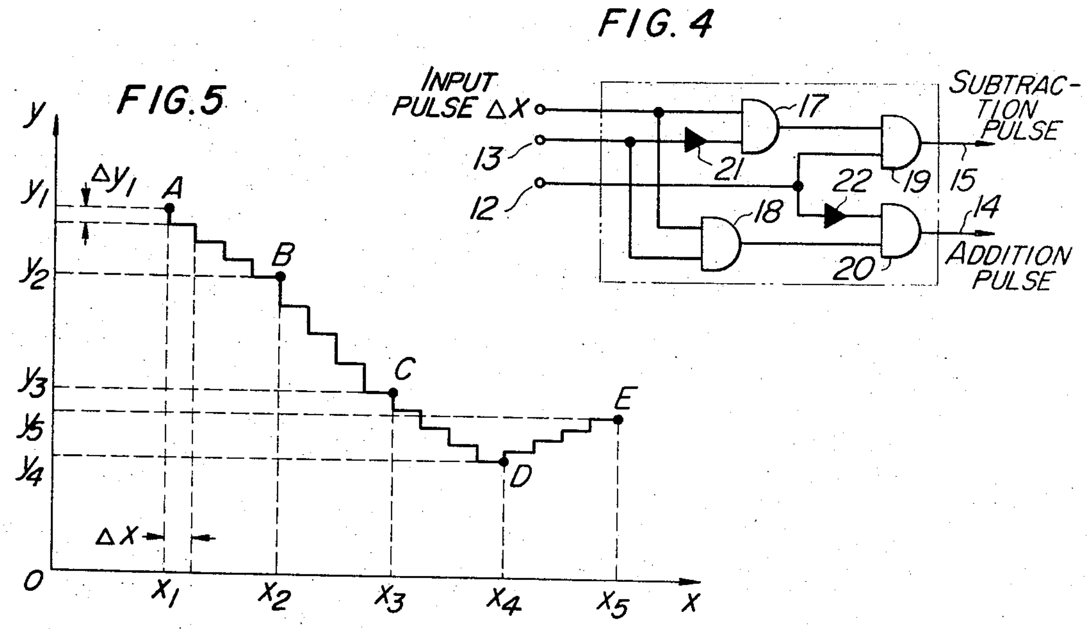
FIG. 4, FIG. 5
FIG. 6
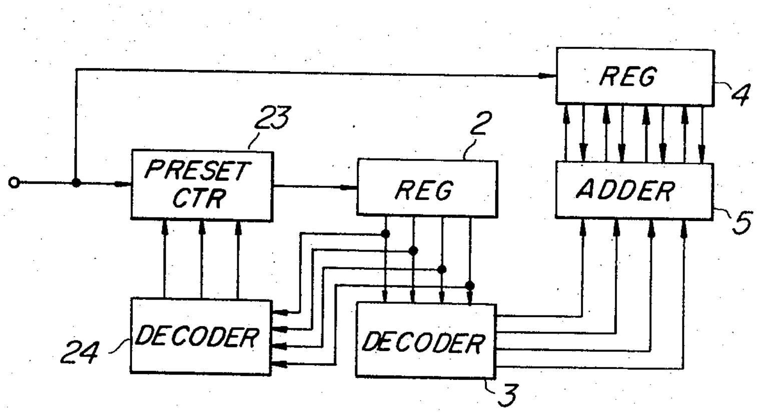
FIG. 7
| SEG-MENT | GRA-DIENT | COL-UMN / ROW | 1 | 2 | 3 | 4 | 5 | 6 | 7 |
|---|---|---|---|---|---|---|---|---|---|
| AB | 0 1 1 | 1 | 1 | 1 | 1 | 1 | 1 | 0 | 1 |
| BC | 1 0 1 | 2 | 1 | 1 | 1 | 1 | 0 | 1 | 1 |
| CD | 0 1 1 | 3 | 1 | 1 | 1 | 1 | 1 | 0 | 1 |
| DE | 0 1 0 | 4 | 0 | 0 | 0 | 0 | 0 | 1 | 0 |
INVENTOR
MASARU INOUE
BY Craig, Antonelli & Hill
ATTORNEYS

FIG. 8

| INPUT PULSE △X | REGISTER 4 |
|---|---|
| 0 | 1 0 0 0 0 0 0 |
| 1 | 0 1 1 1 1 0 1 |
| 2 | 0 1 1 1 0 1 0 |
| 3 | 0 1 1 0 1 1 1 |
| 4 | 0 1 1 0 1 0 0 |
| 5 | 0 1 0 1 1 1 1 |
| 6 | 0 1 0 1 0 1 0 |
| 7 | 0 1 0 0 1 0 1 |
| 8 | 0 1 0 0 0 0 0 |
| 9 | 0 0 1 1 1 0 1 |
| 10 | 0 0 1 1 0 1 0 |
| 11 | 0 0 1 0 1 1 1 |
| 12 | 0 0 1 0 1 0 0 |
| 13 | 0 0 1 0 1 1 0 |
| 14 | 0 0 1 1 0 0 0 |
| 15 | 0 0 1 1 0 1 0 |
| 16 | 0 0 1 1 1 0 0 |

FIG. 9

| SEG-MENT | GRA-DIENT | ROW \ COL-UMN | 1 (12) | 2 (11) | 3 (10) | 4 (9) |
|---|---|---|---|---|---|---|
| AB | 0 1 1 | 1 | 1 | 1 | 0 | 1 |
| BC | 1 0 1 | 2 | 1 | 0 | 1 | 1 |
| CD | 0 1 1 | 3 | 1 | 1 | 0 | 1 |
| DE | 0 1 0 | 4 | 0 | 0 | 1 | 0 |

FIG. 11

| SEG-MENT | ROW \ COL-UMN | 1 | 2 | 3 |
|---|---|---|---|---|
| AB | 1 | 1 | 0 | 0 |
| BC | 2 | 1 | 1 | 0 |
| CD | 3 | 0 | 1 | 0 |
| DE | 4 | 1 | 0 | 1 |

FIG. 10

| INPUT PULSE △X | REVERSIBLE COUNTER 7 | REGISTER 6 | CARRY PULSE 13 | SUB-TRAC-TION PULSE 15 | ADDI-TION PULSE 14 |
|---|---|---|---|---|---|
| 0 | 1 0 0 0 | 0 0 0 | | | |
| 1 | 0 1 1 1 | 1 0 1 | 0 | 1 | 0 |
| 2 | 0 1 1 1 | 0 1 0 | 1 | 0 | 0 |
| 3 | 0 1 1 0 | 1 1 1 | 0 | 1 | 0 |
| 4 | 0 1 1 0 | 1 0 0 | 1 | 0 | 0 |
| 5 | 0 1 0 1 | 1 1 1 | 0 | 1 | 0 |
| 6 | 0 1 0 1 | 0 1 0 | 1 | 0 | 0 |
| 7 | 0 1 0 0 | 1 0 1 | 0 | 1 | 0 |
| 8 | 0 1 0 0 | 0 0 0 | 1 | 0 | 0 |
| 9 | 0 0 1 1 | 1 0 1 | 0 | 1 | 0 |
| 10 | 0 0 1 1 | 0 1 0 | 1 | 0 | 0 |
| 11 | 0 0 1 0 | 1 1 1 | 0 | 1 | 0 |
| 12 | 0 0 1 0 | 1 0 0 | 1 | 0 | 0 |
| 13 | 0 0 1 0 | 1 1 0 | 0 | 0 | 1 |
| 14 | 0 0 1 1 | 0 0 0 | 1 | 0 | 1 |
| 15 | 0 0 1 1 | 0 1 0 | 0 | 0 | 0 |
| 16 | 0 0 1 1 | 1 0 0 | 0 | 0 | 0 |

INVENTOR

MASARU INOUE

BY Craig, Antonelli & Hill
ATTORNEYS

SEGMENTED STRAIGHT LINE FUNCTION GENERATOR

BACKGROUND OF THE INVENTION

1. Field of the Invention

This invention relates to a device for approximating a function of $x$, $y=f(x)$, by a segmented straight line in the case where $x$ coordinate values are given in the form of input pulses $\Delta x$.

2. Description of the Prior Art

Such function generators have been proposed in which functions, $y=f(x)$, are approximated by segmented straight lines by determining circuit constants, such as resistances, in response to an input corresponding to an arbitrary independent variable and generating an output in an analog quantity, such as voltage.

For generating a function in an analog quantity, however, it is necessary to use a device, such as a potentiometer, and the sliding end of such a potentiometer would be mechanically moved. Such mechanical structures inherently have drag, which decreases the accuracy of the generated function and tends to cause errors. Further, an analog type function generator is also influenced by disturbances such as temperature drift and noise, and these may cause errors.

The above defects can be eliminated by arranging a function generator in a digital mode. Thus, various function generators based on digital method have been recently developed. In these function generators, however, pulse trains of such a frequency which is proportional to the slope of the respective segments of approximated line, are usually generated by a binary rate multiplier. The input pulse of a binary rate multiplier, however, is a pulse train of constant repeating period. Thus, for equally divided $x$ coordinate regions, the time required for providing $y$ coordinate displacements varies according to the slope of the respective segments of the approximated figure.

Thus, there is needed a complicated circuit arrangement for discriminating what pulse timing of the input pulses to the binary rate multiplier will represent the function value and for multiplying binary pulses according to the slope of a segment.

SUMMARY OF THE INVENTION

An object of this invention is to provide a function generator in which displacements in $y$ coordinate at equally divided $x$ coordinate values can be obtained from an input pulse train of a constant repeating period, dispensing with a binary rate multiplier.

Another object of this invention is to provide a function generator capable of generating all kinds of functions by a simple circuit arrangement.

In an embodiment of this invention, $x$ coordinate values being given by input pulses $\Delta x$, there is provided means for preliminarily setting displacements $\Delta y$ in $y$ coordinates in accordance with the slope of the respective segments of an approximated figure.

Further, in said means for setting $y$ coordinate displacements $\Delta y$, signals corresponding to the sign of the slope (positive or negative) are stored and each time an input pulse arrives one of said signals is added to means for storing the function values.

Further objects and features of this invention will become apparent in the following description on prefered embodiments taken in conjunction with the accompanying drawing.

BRIEF DESCRIPTION OF THE DRAWING

FIG. 4 shows the logical circuit of FIG. 3, FIG. 5 shows a generated function approximating the segmented line of FIG. 1 generated by the embodiment of FIG. 2 or FIG. 3, FIG. 6 is a block diagram of an embodiment of the logical circuit of FIG. 5 according to this invention, FIGS. 7 to 11 are truth tables for explaining the operation of the embodiments of FIGS. 2, 3 and 6 according to this invention.

DESCRIPTION OF THE PREFERRED EMBODIMENTS

Figure 1:
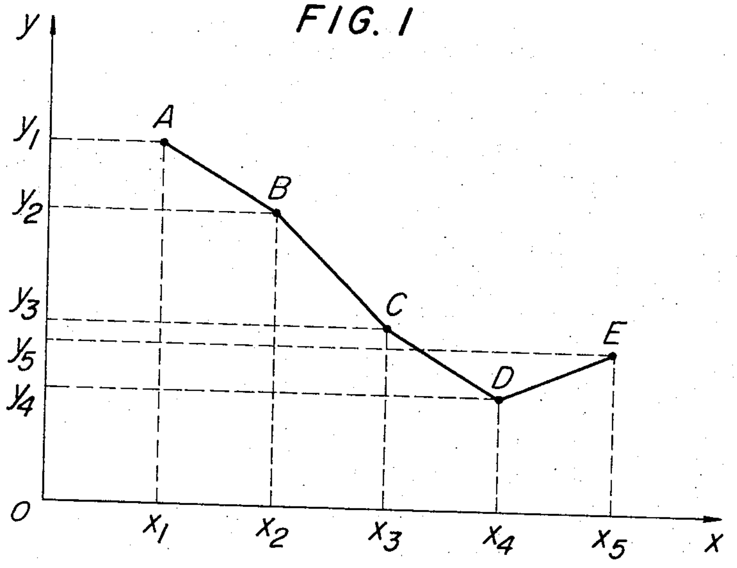
FIG. 1 shows a segmented-line-approximated figure of a function $y=f(x)$ to be generated by this invention.

FIG. 1 is a figure approximating a function, $y=f(x)$, by segmented straight line, to be generated by a function generator. A given function, $y=f(x)$, is divided at equal $x$ coordinate intervals into segmented straight line A-B-C-D-E. Here, each segment of the approximated figure is of step shape in which the $y$ coordinate value changes by $\Delta y$ at each arrival of an input pulse $\Delta x$. Thus, the input pulses $\Delta x$ form a pulse train having a constant repeating frequency of a period corresponding to the distance of $1/n$, for example one-fourth, of the equally divided $x$ coordinates $x_1$, $x_2$, . . . , $x_5$ corresponding to points A to E of said figure.

Next, embodiments of a function generator of this invention will be described in connection with the drawing.

Figure 2:
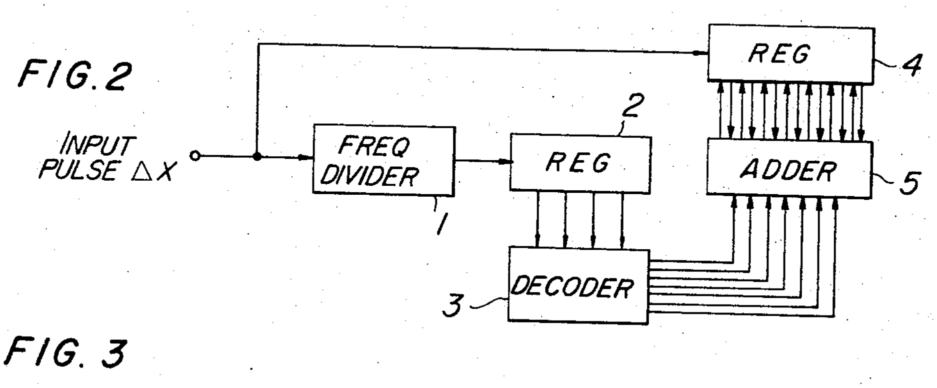
FIG. 2 is a block diagram of an embodiment of function generator according to this invention.

FIG. 2 shows an embodiment of a function generator according to this invention. In this figure, reference numeral 1 indicates a frequency divider, the dividing ratio of which is the number of steps in a stepped representation of the segment. In this embodiment, the number of steps in each segment is four, hence the dividing ratio is one fourth. A shift register 2 stores the output of the frequency divider 1, and based on the stored content selects a coded set signal according to the slope of the respective segments. Coded displacements $\Delta y$ of a function according to the slope of the respective segments are preliminarily set in a decoder 3, which is formed of a diode matrix the number of rows of which is equal to the number of the segments and that of the columns of which is determined by the accuracy of said displacement $\Delta y$. In this embodiment, this matrix is four rows by seven columns. The values of the given function are stored in a register 4, the number of bits of which is equal to the number of columns in the decoder 3, i.e. 7. An adder 5 has a 7-bit structure similar to the register 4, and adds the content of the register 4 and the signal set in the decoder 3 at each arrival of an input pulse $\Delta x$ and then restores the operational result in the register 4. The function generator thus formed operates in the following manner.

Here, it is assumed that signals as shown in the truth table of FIG. 7 are set in the decoder 3, based on the segmented line of FIG. 1. Namely, the slope of a segment when the segment has an upward slope or the complement of the slope of a segment when the segment has a downward slope is coded and set in the decoder 3. Further, it is assumed that in the register 4 the initial value of the segmented figure of FIG. 1, i.e. $y$ coordinate value $y_1$ "1000000" of point A, is stored.

When the first pulse of the input pulse train $\Delta x$ arrives at the frequency divider 1, the divider 1 generates no output. Hence, the shift register 2 selects the first row signal "1111101" preliminarily set in the decoder 3, and sends the signal "1111101" from the decoder 3 to the adder 5. The adder 5 carries out the addition of the content of the register 4 and the set signal sent from the decoder 3 in the following manner.

```
  1000000
+ 1111101
  0111101
```

This result "0111101" is restored in the register 4.

A similar sequence of operations is carried out for the second input pulse $\Delta x$, and as is indicated in FIG. 8 the memory of the register 4 becomes "0111010." The memory changes to "0110111" upon the arrival of the third input pulse $\Delta x$ and then to "0110100" upon the arrival of the fourth input pulse $\Delta x$. The last memory "0110100" corresponds to the coordinate value of point B. At the arrival of the fourth input pulse $\Delta x$, the frequency divider 1 generates an output pulse and changes the content of the shift register 2. Upon this, the signal set in the decoder 3 varies to one corresponding to the slope of segment BC of FIG. 1, i.e. the second row of FIG. 7. Similar operations are repeated to approximate each of the succeeding segments. Namely, the shift register 2 will select the signal "1111101" in the third row corresponding to the slope of segment CD upon the eighth input pulse $\Delta x$ and the signal "0000010" in the fourth row corresponding to the slope of segment DE upon the 12th input pulse $\Delta x$. Thus, the memory provided in the register 4 at each arrival of an input pulse $\Delta x$ becomes as shown in FIG. 8. In FIG. 5, the result of FIG. 8 is shown in $x - y$ coordinate system.

Here, the shift register 2 in FIG. 2 may be substituted by a counter, when a gate circuit is provided for discriminating to what slope the content of the counter corresponds.

Further, when this shift register 2 is substituted by a ring counter, the content of this counter always circulates and hence may repeatedly generate a function which is generated by one cycle.

Thus, a suitable selection of the initial and final value in the register 4 will generate a function of arbitrary shape having continuous, discontinuous or other periodicity.

Figure 3:
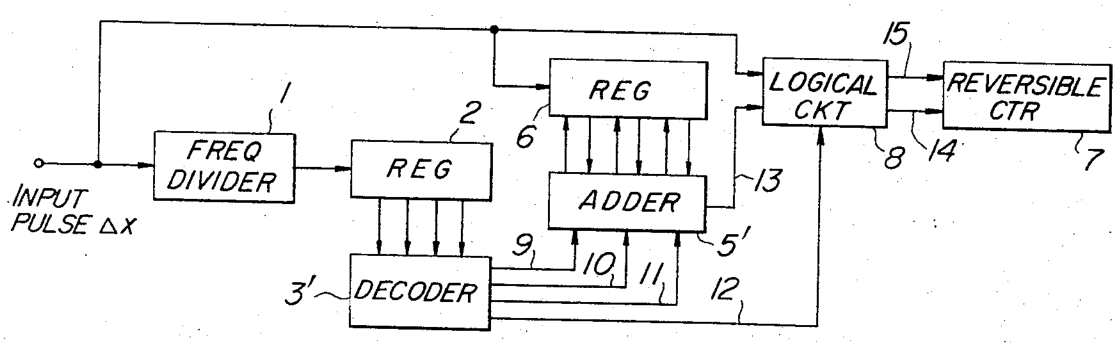
FIG. 3 is a block diagram of another embodiment of function generator according to this invention.

Next, another embodiment of the function generator will be described referring to FIGS. 3 and 4. The slope of a segment can be represented by a 3-bit number as can be seen from FIG. 7. Hence, the register in FIG. 2 may be divided into a lower 3-bit part and an upper 4-bit part as shown in FIG. 3, utilizing the lower part as a register 6 and the upper part as a reversible counter 7. Hence, the adder 5 in FIG. 2 may become an adder 5' of 3-bit structure corresponding to the 3-bit register, and the matrix in the decoder 3 corresponding to the slope becomes a four rows — four columns matrix in a decoder 3'. Here, a column in each row, i.e. the lowest column 12, in FIG. 3,is a slope-setting signal corresponding to the upward or downward slope of a segment. A matrix to be set in the decoder 3' is similar to that of the decoder 3 and is shown in FIG. 9. In FIG. 9, the first column in each row indicates the slope (upward or downward) of segment, "1" indicating a downward segment and "0" indicating an upward segment.

Further, a logic circuit 8 is controlled by the input pulse, the carry pulse $\Delta x$ from the adder 5', and the slope-indicating signal in the decoder 3', and generates an additive or subtractive pulse 14 or 15 for the reversible counter 7. This logic circuit 8 comprises AND circuits 17 to 20 and inverters 21 and 22, as is shown in FIG. 4.

Here, it is assumed that the $y$ coordinate value of point A, i.e. the initial value of the segmented line, is "1000000" as is the case with FIG. 2. In this case, the upper four bits "1000" of the initial value are stored in the reversible counter 7 and the lower three bits "000" are stored in the register 6.

Under such conditions, the arrival of an input pulse $\Delta x$, (corresponding to coordinate value $x_1$ of $x$-coordinate system shown in FIG. 1) does not generate an output pulse from the frequency divider 1, and the signal "1101" set in the first row of the decoder 3' is selected by the shift register 2 and appears at the terminals 9 to 12. Namely, "1" at the terminal 9, "0" at the terminal 10, "1" at the terminal 11, and "1" at the terminal 12.

On the other hand, since an input pulse $\Delta x$ is given to the register 6, the content "000" is sent to the adder 5'. The adder 5' adds the content "000" of the register 6 and the slope signal "101" provided through the terminals 9 to 11, and restores the operational result in the register 6. In this operation, no carry pulse is generated from the terminal 13. Thus, in the logical circuit 8, an output is generated from the inverter 21 as also can be understood from FIG. 4, and opens the AND circuit 17 to allow the said input pulse $\Delta x$ to pass through to the AND circuit 19. Further, since a downward signal "1" is also applied to the AND circuit 19 from the terminal 12 of the decoder 3', said input pulse $\Delta x$ is allowed to pass through the AND circuit 19 and sent from the terminal 15 to the reversible counter 7 as a subtraction pulse. By this subtraction, the content of the reversible counter 7 takes a new value "0111", "0001" being subtracted from "1000."

As a result, the generated function value upon the arrival of the first input signal becomes "0111101" based on the content of the reversible counter 7 representing the upper four bits and the content of the register 6 representing the lower three bits.

When the next input pulse $\Delta x$ arrives, the frequency divider 1 does not generate an output pulse, and the decoder 3' holds said set signal "1101." Thus, the adder 5' adds the slope signal "101" and the content of the register 6 "101," and restores the operation result "010"again in the register 6. In this operation, a carry pulse is generated and supplied through the terminal 13 of the adder 5' to the logical circuit 8. By this carry pulse, neither a subtraction nor an addition pulse is generated in the logical circuit 8 and the reversible counter 7 keeps the foregoing content "0111." Namely, only the content of the register 6 representing the lower three bits is subjected to a change in the function values generated upon the arrival of the second input pulse $\Delta x$, and the function value becomes "0111010,"

as can be seen from FIG. 10. Thus, until the arrival of the fourth input pulse $\Delta x$, operation is carried out with the signal "1101" as for the decoder 3′, representing the slope of segment AB. Upon the arrival of the fourth input pulse $\Delta x$, the reversible counter 7 is provided with the signal "0110" and the register 6 "100," representing $y$ coordinate value $y_2$ of point B in FIG. 1 as a whole. On the other hand, when the fourth input pulse $\Delta x$ arrives, an output pulse is generated from the frequency divider 1 to renew the content of the shift register 2, and the set signal in the decoder 3′ changes to the signal corresponding to the slope of segment BC of FIG. 1, i.e. signal "1011" in the second row of FIG.9. With this set signal, similar operations as above are repeated for the fifth to the eighth input pulse $\Delta x$. Here, the eighth pulse $\Delta x$ changes the generated function value to coordinate value $y_3$ shown in FIG. 1. Upon this, an output pulse is generated from the frequency divider 1 to change the content of the shift register 2 and the set signal in the decoder 3′ becomes "1101" of the third row in FIG. 9 corresponding to the slope of segment CD. With this signal "1101" similar operations proceed for the ninth to the 12th input pulse $\Delta x$. The 12th input pulse $\Delta x$ makes the signal in the decoder 3′ to "0010" corresponding to the slope of segment DE shown in FIG. 1, with which operations for the 13th to the 16th input pulse $\Delta x$ are carried out. Here, in the operation for segment DE shown in FIG. 1, since the segment has an upward slope, the slope signal "010"in said signal "0010" indicates the slope itself and the first bit "0" indicates that the slope is upward. By the logical circuit 8, the adder 5′ adds the content of the register 6 and said slope signal "010." When this operation generates a carry, a carry signal is generated from the terminal 13 of the adder 5′ to open the AND circuit 18 of the logical circuit 8 allowing the input pulse to pass. Further, since the decoder 3′ applies an upward signal "0" from the terminal 12 to the inverter 22, the AND circuit 20 opens to apply said input pulse $\Delta x$ to the reversible counter 7 through the terminal 14 as an addition pulse 14.

In the above manner, function values as shown in the truth table of FIG. 10 are obtained for the segments of the figure shown in FIG. 1, which are same with those of FIG. 8 obtained from the embodiment of FIG. 2 and as shown in FIG. 5 represented in $x - y$ coordinate system. Further, it is possible to generate the function as an analog signal of, for example, voltage or current, by passing the contents of the reversible counter 7 and the register 6 through the D – A converter.

Yet further, it is also possible to generate a monotonically increasing function by setting the slope itself (not the complement) in the decoder 3′ of FIG. 3 or the decoder 3 of FIG. 2, and a monotonically decreasing function by setting only the complement for the slope.

In the above description, a given function is approximated by segmented line with $x$ coordinate system equally divided, but there are some cases where a function with unequally divided $x$ coordinate system is desired. In such as case, the frequency dividing ratio of said frequency divider may be appropriately altered. One of such embodiments is shown in FIG. 6. FIG. 6 shows an improvement for the function generator of FIG. 2, but the device of FIG. 3 may be altered similarly.

In FIG. 6, similar numerals are used for similar parts as those of FIG. 2. A preset counter 23, and a decoder 24, for example comprising a diode matrix, for preliminarily setting the number of steps in respective segments are provided. Assuming that the $x$ coordinate system of the segmented line in FIG. 1 is unequally divided and that the number of steps of the respective segments is below seven, AB having four steps, BC two, CD six, and DE three, the matrix in the decoder 24 has four rows, three columns with the set signal as shown in FIG. 11. The signal in one row is the complement of the coded value of the number of steps of each segment. In this case, the preset counter 23 has a three-bit structure since the number of steps of a segment of said approximation line is below seven.

Thus, in the initial condition, signal "100" of the first row in FIG. 11 representing segment AB is preset in the preset counter 23. Upon the application of the input pulses, the preset counter 23 begins to count the number of input pulses. Application of four input pulses generates an overflow pulse to renew the content of the shift register 2. Then, the decoder 3 selects a set signal corresponding to the slope of segment BC and the decoder 24 presets signal "110" of the second row in FIG. 11 corresponding to the complement of the number of steps of segment BC in the preset counter 23. The preset counter 23 generates an overflow pulse at the second input pulse. Then, the decoder 3 selects the signal corresponding to the slope of segment CD, and the decoder 24 presets signal "010" of the third row of FIG. 11 corresponding to the complement of the number of steps of segment CD in the preset counter 23. Similar operations are repeated for further process. The adder 5 adds the content of the register 4 and the signal set in the decoder 3 upon each arrival of an input pulse and restores the result in the register 4, as is similar to the process described in connection with FIG. 2.

In this way, a function may be easily generated also in the case where the $x$ coordinate system of the segmented approximation figure is unequally divided.

As is described above, according to this invention, there is no need for mechanical means for driving a potentiometer, etc. as is the case with a conventional analog type function generator, hence both the accuracy and the stability are improved. Further, in contrast to a conventional digital type function generator in which the repeating frequency of the input pulses is altered according to the slope of respective segments, any function can be generated easily and at a constant rate using input pulses of a constant repeating frequency by preliminarily setting the slope of the respective segments.

Further, the approximated segmented figure of a given function may be either equally or unequally divided. It is also possible to further decrease the approximation error and increase the accuracy with respect to the given function by increasing the repeating frequency of the input pulses and accordingly increasing the number of bits in the register and the reversible counter.

Although some embodiments are described hereinabove, this invention should not be limited by the foregoing embodiments, but it is apparent that various modifications and alternatives are possible within the spirit and scope of the following claims.

I claim:

1. A function generator for approximating a function $y=f(x)$ by a segmented straight line with $x$ coordinate values given in the form of input pulses $\Delta x$ successively, comprising:

a frequency divider for dividing input pulses $\Delta x$ at a predetermined frequency dividing ratio which corresponds to the number of steps in each of said segments;

a diode matrix having rows, the number of which is equal to the total number of said segments, and columns, the number of which is determined by the required accuracy for displacements $\Delta y$ of the function which are coded corresponding to the slope of said segments;

means for selecting a row of said diode matrix upon receipt of an output pulse from said frequency divider;

means for memorizing the values of said function $f(x)$; and means for adding said displacements $\Delta y$ to the content of said memorizing means at each of said input pulses $\Delta x$ and restoring the addition result to said memorizing means, whereby the content of said memorizing means is arranged to indicate the value of the function $f(x)$ with respect to the input pulses $\Delta x$.

2. A function generator according to claim 1, in which said selecting means is a shift register having a same number of digits as that of a row of said diode matrix.

3. A function generator according to claim 1, in which said selecting means is a ring counter having the same number of digits as that of a row of said diode matrix.

4. A function generator according to claim 1, in which said frequency divider has a variable frequency dividing ratio.

5. A function generator according to claim 1, in which said displacements $\Delta y$ of the function represent the slope of a segment when the slope is positive, and the complement of the slope when the slope is negative.

6. A function generator for approximating a function $y=f(x)$, by a segmented straight line with $x$ coördinate values given in the form of input pulses $\Delta x$ successively, comprising:

a frequency divider for dividing input pulses $\Delta x$ at a predetermined frequency dividing ratio which corresponds to the number of steps in each of said segments;

a diode matrix having rows, the number of which is equal to the total number of segments, and columns, the number of which is determined by the required accuracy for the displacements $\Delta y$ of the function which are coded in accordance with the slope of the segments and including a signal representing the sign of said slope of the segments;

means for selecting a row of said diode matrix upon receipt of an output pulse of said frequency divider;

means for dividedly memorizing the values of said function $f(x)$ in a lower significant digit part and an upper significant digit part;

means for adding the displacements $\Delta y$ of said segments which are selected by said selecting means to the content of the lower significant digit part of said memorizing means at each of said input pulses $\Delta x$ and then restoring the addition result in said lower significant digit part; and a logical circuit for controlling the upper significant digit part of said memorizing means based on carry pulses generated in said addition and said input pulses $\Delta x$ and the signals representing the sign of the slope, whereby the content of said memorizing means represents the value of said function $f(x)$ with respect to the given input pulses.

7. A function generator according to claim 6, in which said logical circuit includes means for increasing the content of said upper significant digit part when the slope of said segment is positive and decreases when the slope is negative.

8. A function generator according to claim 6, in which said selecting means is a shift register having the same number of digits as that of a row of said diode matrix.

9. A function generator according to claim 6, in which said selecting means is a ring counter having the same number of digits as that of a row of said diode matrix.

10. A function generator according to claim 6, in which said frequency divider has a variable frequency dividing ratio.

11. A function generator according to claim 6, in which said displacements $\Delta y$ represent the slope when the slope of said segment is positive and the complement of said slope when the slope is negative.

12. A function generator according to claim 6, in which said signal representing the sign of said segments is "0" (binary notation) when said slope is positive and "1" (binary notation) when said slope is negative.

* * * * *